United States Patent
Osadchyy et al.

(10) Patent No.: US 8,462,368 B2
(45) Date of Patent: Jun. 11, 2013

(54) PRINTING DEVICE MANAGEMENT BASED ON TOPICS OF INTEREST AND OBJECT LOCATORS

(76) Inventors: Oleksandr Osadchyy, Duisburg (DE); Clemens Junge, Korschenbroich (DE)

( * ) Notice: Subject to any disclaimer, the term of this patent is extended or adjusted under 35 U.S.C. 154(b) by 1360 days.

(21) Appl. No.: 11/378,955

(22) Filed: Mar. 17, 2006

(65) Prior Publication Data

US 2007/0216932 A1    Sep. 20, 2007

(51) Int. Cl.
   *G06F 3/12*    (2006.01)
(52) U.S. Cl.
   USPC .......................... 358/1.15; 709/219; 709/250
(58) Field of Classification Search
   USPC ................................................. 358/1.1–1.15
   See application file for complete search history.

(56) References Cited

U.S. PATENT DOCUMENTS

| | | | | |
|---|---|---|---|---|
| 6,266,693 B1 * | 7/2001 | Onaga | ........................... | 709/219 |
| 6,762,852 B1 | 7/2004 | Fischer | | |
| 6,920,506 B2 | 7/2005 | Barnard | | |
| 6,941,324 B2 * | 9/2005 | Plastina et al. | ............. | 707/104.1 |
| 7,099,937 B1 * | 8/2006 | Ochiai et al. | ................... | 709/224 |
| 2002/0078183 A1 | 6/2002 | Helms | | |
| 2002/0143915 A1 | 10/2002 | Mathieson | | |
| 2003/0014511 A1 | 1/2003 | Maekawa | | |
| 2003/0023732 A1 | 1/2003 | Cohen | | |
| 2003/0030842 A1 | 2/2003 | Suyehira | | |
| 2004/0019671 A1 | 1/2004 | Metz | | |
| 2004/0098480 A1 * | 5/2004 | Sekizawa | ...................... | 709/224 |
| 2004/0184072 A1 | 9/2004 | Jacobsen | | |
| 2005/0057768 A1 | 3/2005 | Kuppens-Ellouz | | |
| 2005/0108679 A1 | 5/2005 | Jensen | | |

* cited by examiner

*Primary Examiner* — Benny Q Tieu
*Assistant Examiner* — Michael Y Tzeng

(57) ABSTRACT

A system for managing printing device related objects on a network, comprising a GUI, by first selecting a topic of interest from a category of interests; then selecting a predefined object locator, which filters objects based on associated criteria. The system enables graceful scaling, wherein the number of topics of interest in the first GUI pane and the complexity of the displayed information in the second GUI pane stay roughly constant even when the number of devices and objects in an organization increases significantly. The methods also include Static, Dynamic, Permanent, and Temporary object locators; hierarchically displayed topics and object groupings displayed in an integrated manner; defining new topics, topic actions, and object locators; and selecting an action for property and printing device related object, then displaying a topic of interest associated with the selected action.

20 Claims, 9 Drawing Sheets

PRINTING DEVICE MANAGEMENT BASED ON TOPICS OF INTEREST AND OBJECT LOCATORS

CROSS-REFERENCES TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

This invention relates to management of printing devices, and more particularly to user interface for managing printing device related objects.

BACKGROUND OF THE INVENTION

Existing systems and methods for managing printing devices on a network have several shortcomings. They typically handle only devices and do not cover the expanding varieties of objects related to printing devices. Since they typically group printing devices by grouping based on objects, they do not achieve graceful scaling, in that when there is a significant increase in the number of devices in an organization, the complexity of information presented to the user gets out of control. The existing systems for management of printing devices in an organization suffer from these and related problems with respect to flexibility and efficiency. Especially in mid- to large-scale organizations, better methods and systems are needed to handle, manage, and monitor the increasing number and complexity of printing device related objects. The present invention arose out of the above concerns associated with managing printing device related objects in an organization.

SUMMARY OF THE INVENTION

Methods, computer program products, computing and printing systems, and GUI methods for management of printing device related objects are described. Printing device related objects include, in addition to the objects traditionally understood as printing devices, the following objects: users, devices, alerts, hosts, queues, jobs, accounts, balances, etc. In the following descriptions, printing device related objects are also referred to as printing devices and related objects.

System and methods are described for providing a device management user interface to manage and monitor printing devices and related objects, first offering a choice from a category of interest to select topic of interest, which represents the interest in portion of information; then selecting predefined object locator, which filters subset of registered printing devices or related objects by criteria. Finally, displaying content of the topic for filtered objects in the view, such as list view, diagram view, map view or report view, including displaying on user need child popup window with selectable actions; receiving a selection of one action and selecting topic of interest with information to associated printing devices or related objects.

The present invention generally relates to system and methods for providing a user interface to manage and monitor document processing devices such as copiers, scanners, printers, etc and related objects, and more particularly for providing the central point user interface to manage and monitor printing device related objects with their associations from the user's individual point of interest for small to mid and large enterprise organizations.

Mid to large size organizations typically have many network- and locally-connected to the PC printing devices including printers, multifunctional peripherals (MFPs), plotters, etc. Usually management of printing devices in such organizations is consolidated into a separate department or delegated to 3rd party service provider. Along with device management they deal also with user, alert, host, queue, job and account management: to manage not only devices but also other types of related objects: to watch alerts, manage balances of user or account, install/uninstall software to/from the host, monitor print queue usage, to control printed jobs and so on.

Current printing device management application programs are typically executed on centralized computer and provide system and methods to define organization or specific printing device groups for more efficient device management and collecting of usage data. But the continued evolution of printing device into sophisticated and function reach printing device, which form complex environment with software services, reduced their efficiency.

Some sophisticated organizations may have individual grouping polices not only for printing devices but also for other printing device related objects. Easy foreseeable solution for typical device management application is to provide grouping not only for devices but also for other objects. But it leads to losing either in flexibility or in usability. For example from practiced ways, one is to support in application multiple group hierarchies what makes it inflexible, or another is to allow mix all objects in one group hierarchy what makes it very hard in operation.

Managing printing devices, printing device related objects and increased amount of properties in one application, for small to large enterprise organizations requires an appropriate user interface and efficient collecting of data. For a small organization there is often a misbalance present in user interface of typical device management application with major focus on a grouping function. Such organizations have only several printing devices and here grouping is not as important as manageability of the numerous properties of printing devices and printing device related objects. Part of the user interface for managing groups stays always empty and takes space away required by part for managing properties.

There can be many users involved in the organization in management of printing devices or related objects. Sometimes in focus of interest of a Service Technician are only printing device generated alerts and printing device settings. He can be one of many Service Technicians in the organization and be responsible only for a subset of printing devices and specific alerts. Others, as Administrators or Asset Managers can have other responsibilities and interests in the system. Therefore flexibility in the ability to customize user interface individually by user for specific management activity is much desired.

Printing device related objects have multi level, often circular associations to each other. Host has associated to it print queues, queue has associated printing devices, printing device has several defined user accounts, account it is a stock of consumption units associated with a user, user is associated to print queues and account is defined on several printing devices. Often graphical user interface of legacy printing device management applications has treated only some associations and have had no common flexible way of management of the associations. The user may find in graphical user interface some manageable associations as unnecessary and other as missing.

The present invention overcomes the deficiencies and limitations commonly found in previous systems that manage printing devices on a network of an organization. The present invention proposes a system and methods providing a user interface to define organization or specific printing device and related object categories of topics, topics of interest, topic actions and locators are described.

The system includes a central point user interface from the user's individual perspective, which permits user in simplified way from a category of interest select topic of interest, which represents the interest in portion of information; then select one of object locators predefined in the topic, which filters subset of registered printing devices or related objects by criteria. Finally, user interface displays content of the topic for filtered objects in the view, such as list view, diagram view, map view or report view. On user need in displaying of the associated objects for the selected items in the view, child popup window with selectable topic actions is displayed. After selecting one action by user, user interface displays topic of interest with information to associated printing devices or related objects. As a result centralized management and monitoring, as well as collecting of data, of different printing device related objects, their numerous properties and associations is more efficient for small to mid and large enterprise organizations; and also user interface is flexible to be customized for individual users and their activity interests.

To manage and monitor printing device related objects the methods of the present invention include management of a structure of categories of interest, management of topics of interest in a category of interest. The methods further include management of object locators assigned to every topic of the interest and management of actions assigned to every topic of the interest.

The invention will be more fully understood upon consideration of the detailed description below, taken together with the accompanying drawings.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
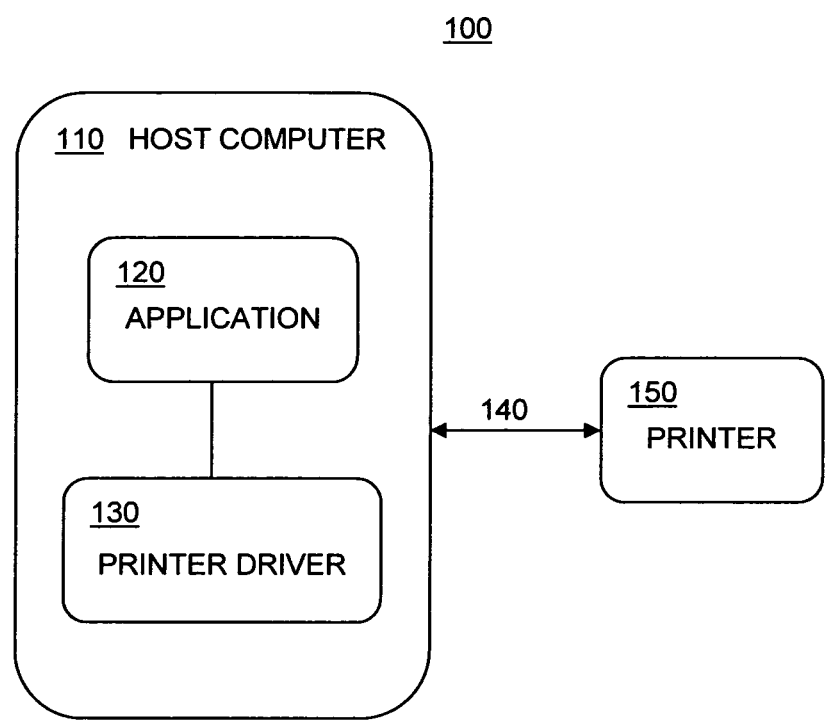
FIG. 1 is a simplified block diagram showing connection of a computing system to a printer, in accordance with a preferred embodiment of the present invention.

FIG. 1 is a simplified block diagram showing connection of a computing system to a printer, in accordance with a preferred embodiment of the present invention. FIG. 1 shows a general printing system setup 100 that includes a host computer 110 and a printer 150. Here, the printer 150 may be any device that can act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS (Disk Operating System) Windows, Unix, Linux, Palm OS, or Apple OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer drivers, and it is also suited for other device drivers. The above explanations regarding FIG. 1 used a printer driver rather than a general device driver for concreteness of the explanations, but they also apply to other device drivers. Similarly, the following descriptions of the preferred embodiments generally use examples pertaining to printer driver, but they are to be understood as similarly applicable to other kinds of device drivers.

Figure 2:
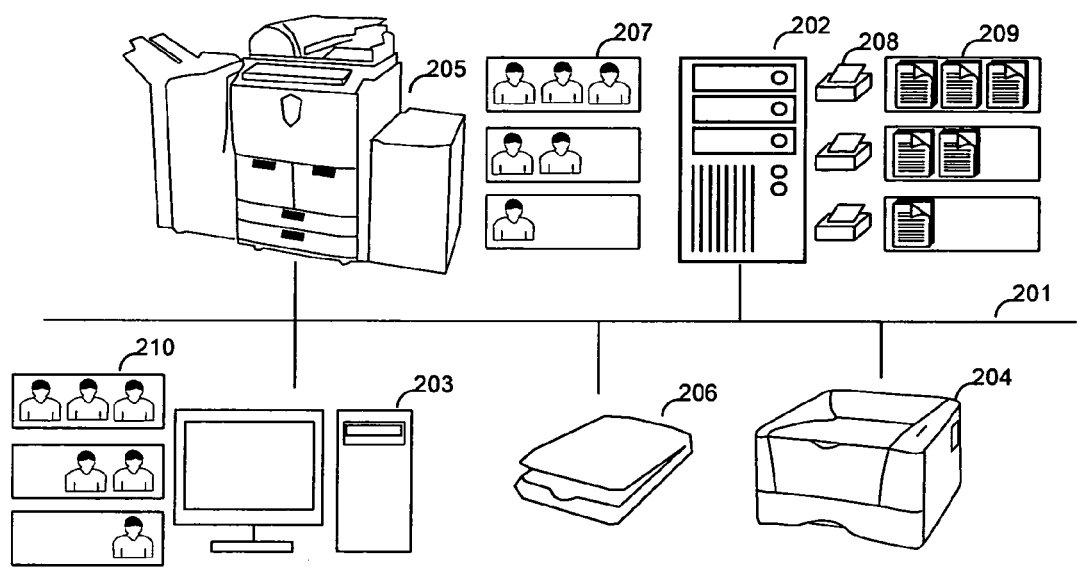
FIG. 2 is a simplified block diagram of document processing systems and devices on a network of an organization, in accordance with a preferred embodiment of the present invention.

FIG. 2 is a simplified block diagram of document processing systems and devices on a network of an organization, in accordance with a preferred embodiment of the present invention. A network 201 interconnects several computers and peripherals. Among them connected on the network there could be any number of personal computers 203, shared servers 202, scanners 206, such networked printing devices as printers 204, and multifunctional peripherals 205. For a device management system to be truly efficient, it is not sufficient to operate only physical devices, but it is necessary to operate device related objects, which are more specific to the functions of the devices. For example, on personal computers 203 there are typically any number of users 210 authorized to access services of the personal computers and other networked document processing system resources, such as servers 202. On networked printing devices there are typically several accounts 207; and among shared servers 202 there could be print spool servers with many print queues 208 and queued, processed or running print jobs 209. The present invention enables efficient management of many such printing device related objects.

Figure 3:
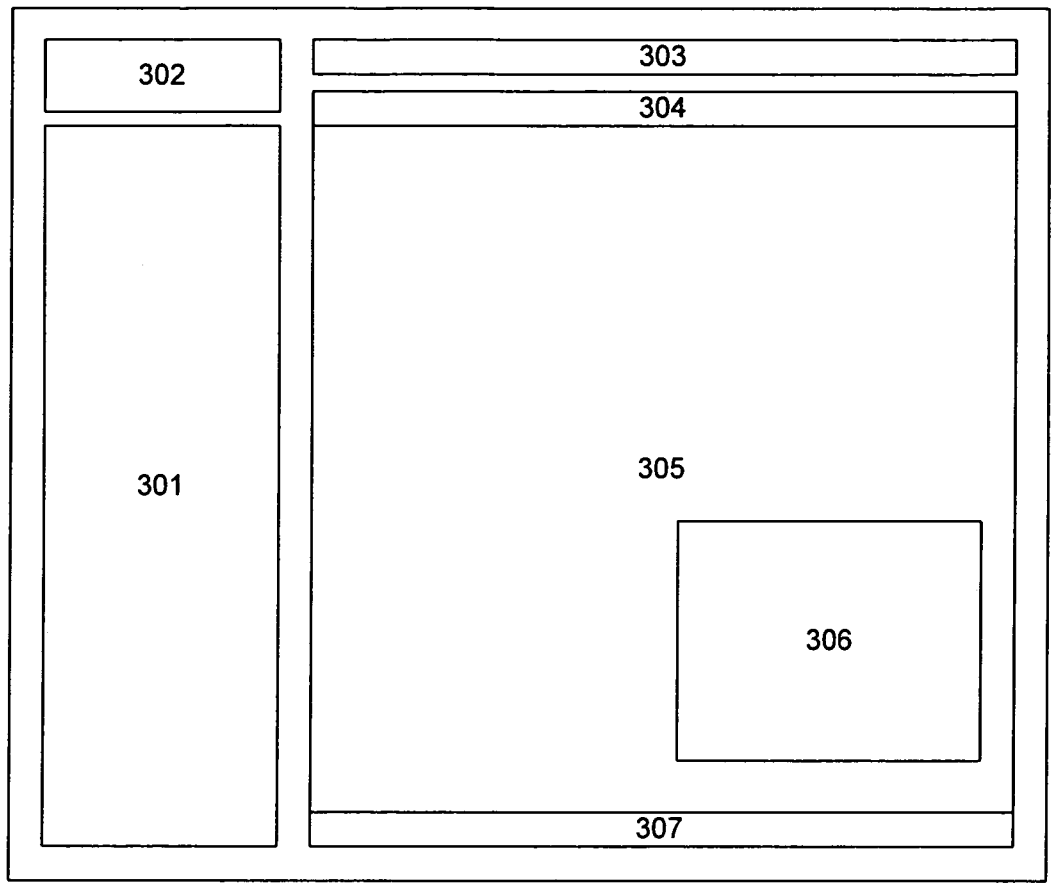
FIG. 3 is a block diagram of a user interface for managing printing devices, in accordance with a preferred embodiment of the present invention.

FIG. 3 is a block diagram of a user interface for managing printing devices, in accordance with a preferred embodiment of the present invention. A left pane tree 301 contains categories of topics and topics of interest. A top left pane tree toolbar 302, provides controlling functionality over the tree 301 to create, modify or delete categories of topics their categories of topics or their topics of interest. A top pane area 303 displays the information about categories of topics of currently selected topic of interest, topic of interest itself and its active locator. Another top tabbed pane area 304 contains plurality of selectable locators. Selected topic of interest in combination with selected locator define which information, which properties of printing device related object in which view will be displayed in central view pane 305. Bottom right pane input field 307 it is an area where search criteria can be entered to search in information displayed in central view pane 305. Executed searches will be classified as temporary dynamic locators and displayed in appropriate top tabbed pane area 304. For the selected multiple properties and printing device related object popup window 306 with list of selectable actions can be displayed.

Figure 4:
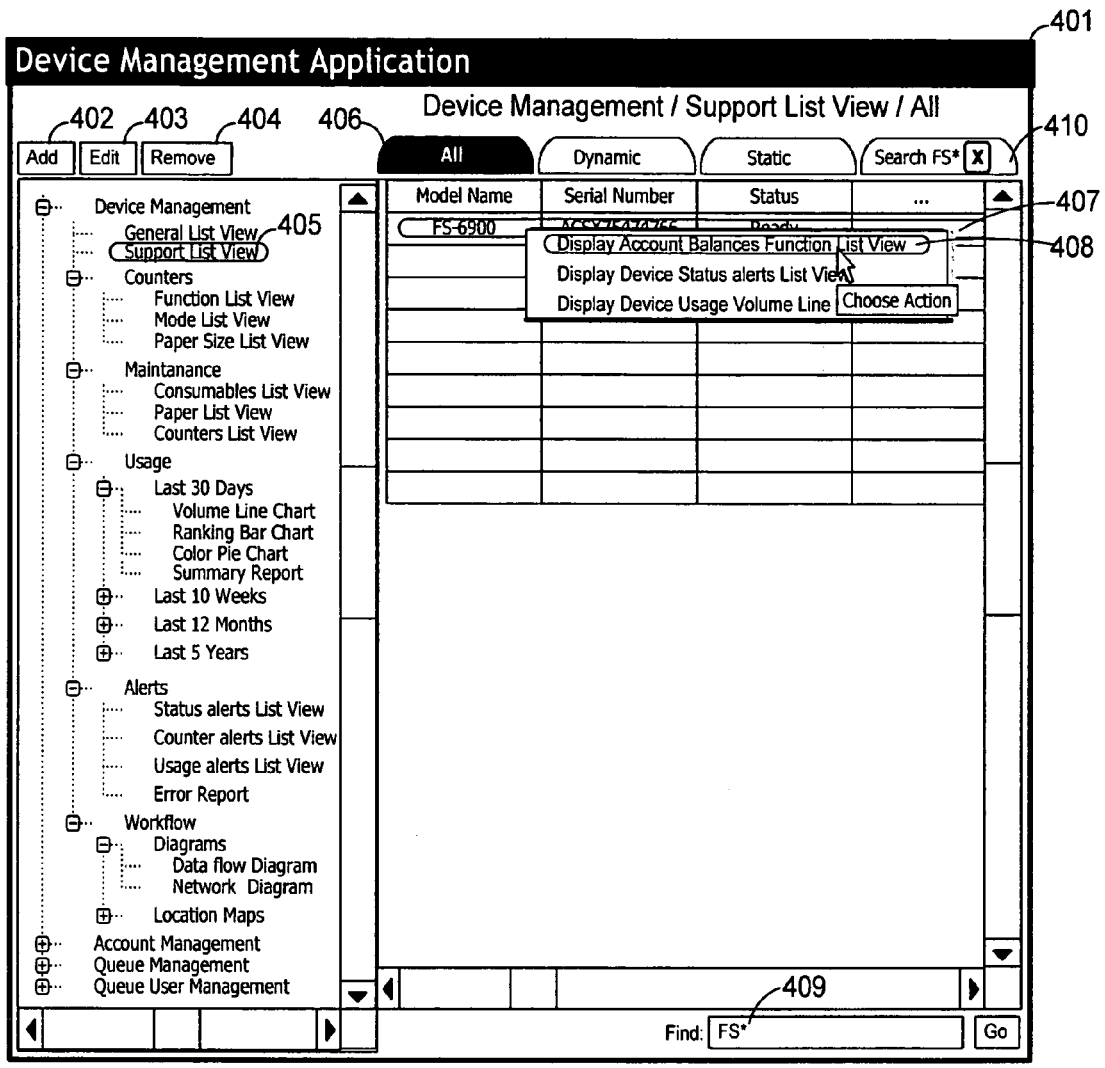
FIG. 4 is an illustration of exemplary GUI embodiment, in accordance with a preferred embodiment of the present invention.

FIG. 4 is an illustration of exemplary GUI embodiment, in accordance with a preferred embodiment of the present invention. Window 401 is a main window of a device management application. The main window contains a tree of categories of topics and topics of interest (left pane tree) from which a user may choose. The user has the option of creating a new category of topics, a new topic of interest, a new object locator or a new topic action, by the "Add" feature 402. For example, referring to FIG. 4 and FIG. 5 user has added root categories of topics and named them: Device Management, Account Management, Queue Management, and Queue User Management. For each root category of topics user has added other categories of interest, like for Device Management: Counters, Maintenance, Usage, Alerts and Workflow. For each category of topics user has added topics of interest and specified their names, like for Counters: Function List View, Mode List View and Paper Size List View. The user has also the option of expanding one of the previously defined categories of topics and seeing the list of nested categories of topics and topics of interest or collapsing the category of interest and hiding nested information. The user has the option of selecting from the category of topics one of the previously defined topics of interest. The user has also the option of selecting object locator from the plurality of associated object locators to the selected topic of interest. For example, referring to FIG. 4 a user expands a particular category of topics, such as "Device Management" and selects a particular topic of interest 405, such as "Support List View".

Selecting topic of interest highlights it in the left pane tree, also highlights last selected object locator and displays associated with the topic properties of printing device related objects in central view pane. By default object locator "All" is always defined and selected 406, which locates all objects without any filtering. User can change selected object locator to another defined one. Defined objects are previously added and named by the user. For example, referring to FIG. 4 user added "Dynamic" and "Static" object locators to the "Support List View" topic of interest and user can choose between them.

Selecting printing device related object row with displayed associated to the topic properties in the exemplary "Support List View" highlights the row 407 in the list. In embodiments to the selected row, child popup window with selectable topic actions can be displayed (such as by pressing right mouse button or appropriate popup menu key of the keypad). The user may then select one of the defined topic actions, which are previously added and named by the user. For example, referring to FIG. 4 user selects in the list view row 407 with the device "FS-6900" and from the displayed child popup window selects "Display Account Balances Function List View" 408.

Figure 5:
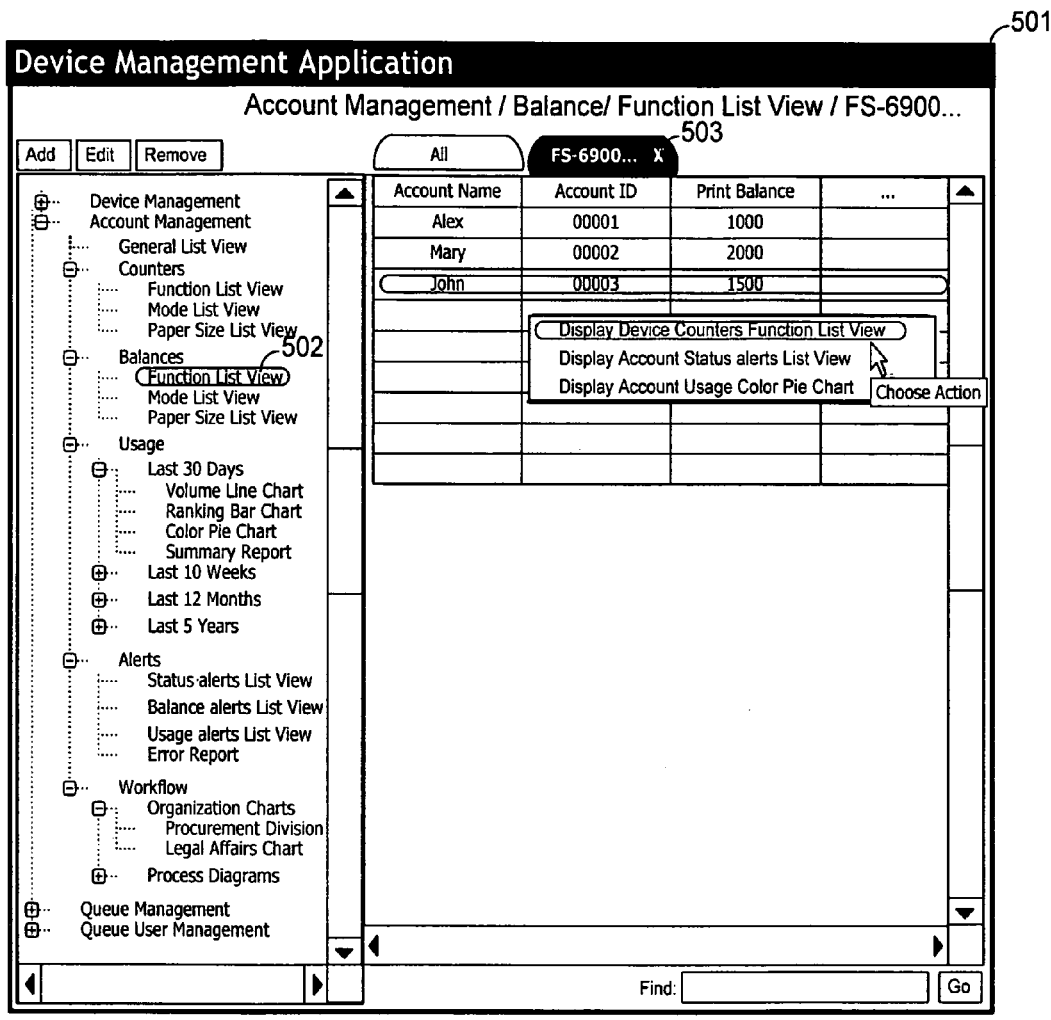
FIG. 5 illustrates another exemplary GUI embodiment, in accordance with a preferred embodiment of the present invention.

Selecting topic action highlights it in the child popup window. Then window disappears and selection of the topic of interest in left pane tree changes to target topic of interest, which is associated with the action. Appropriate categories of interest are collapsing and expanding. A new temporary dynamic object locator is created and selected. And finally associated with the target topic properties of printing device related objects in central view pane are displayed. For example, referring to FIG. 4 user wants to see accounts, which are defined on the device FS-6900 and selects "Display Account Balances Function List View" 408. Selection of the topic of interest in left pane tree changes to the "Function List View" 502 as it is shown in FIG. 5. The root category of topics "Device Management" is getting collapsed and category "Accounting Management" and its category "Balances" are getting expanded. A new temporary dynamic object locator with criteria to filter accounts to only those, which are defined on the device FS-6900 is created and selected. And finally list view in central view pane shows associated to the "Function List View" properties of the accounts-balances of the function counters.

User may save the temporary dynamic object locator and make it permanent or close and destroy it by pressing "X" button 503. The user has the option of editing or removing an existing category of topics, topic of interest, object locator or topic action by the "Edit" 403 or "Remove" 404 in FIG.4 features appropriately.

In embodiments user specifiable search criteria to filter printing device related objects is included. Search can be performed on displayed in selected topic of interest with selected object locator properties. Entering search criteria to the input field and selecting "Go" creates and adds temporary locator to the selected topic of interest. For example, referring to FIG. 4 user wants to see, in the selected topic of interest "Support List View" from selected "All" object locator, only devices which have among displayed properties starting with "FS", he enters "FS*" in bottom right pane input field 409 and presses "Go". A new temporary dynamic object locator with criteria to filter devices to only those, which are matching criteria "FS*" is created and selected. And finally list view in central view pane shows filtered devices and their properties associated to the "Support List View".

User may save the temporary dynamic object locator and make search results permanent or close and ignore results by pressing "X" button 503.

Referring to FIG. 5 user may select in the list view row with the account "John" and from the displayed child popup window select "Display Device Counters Function List View" to select topic of interest with information about device function counters, where devices are only where account John is defined.

Figure 6:
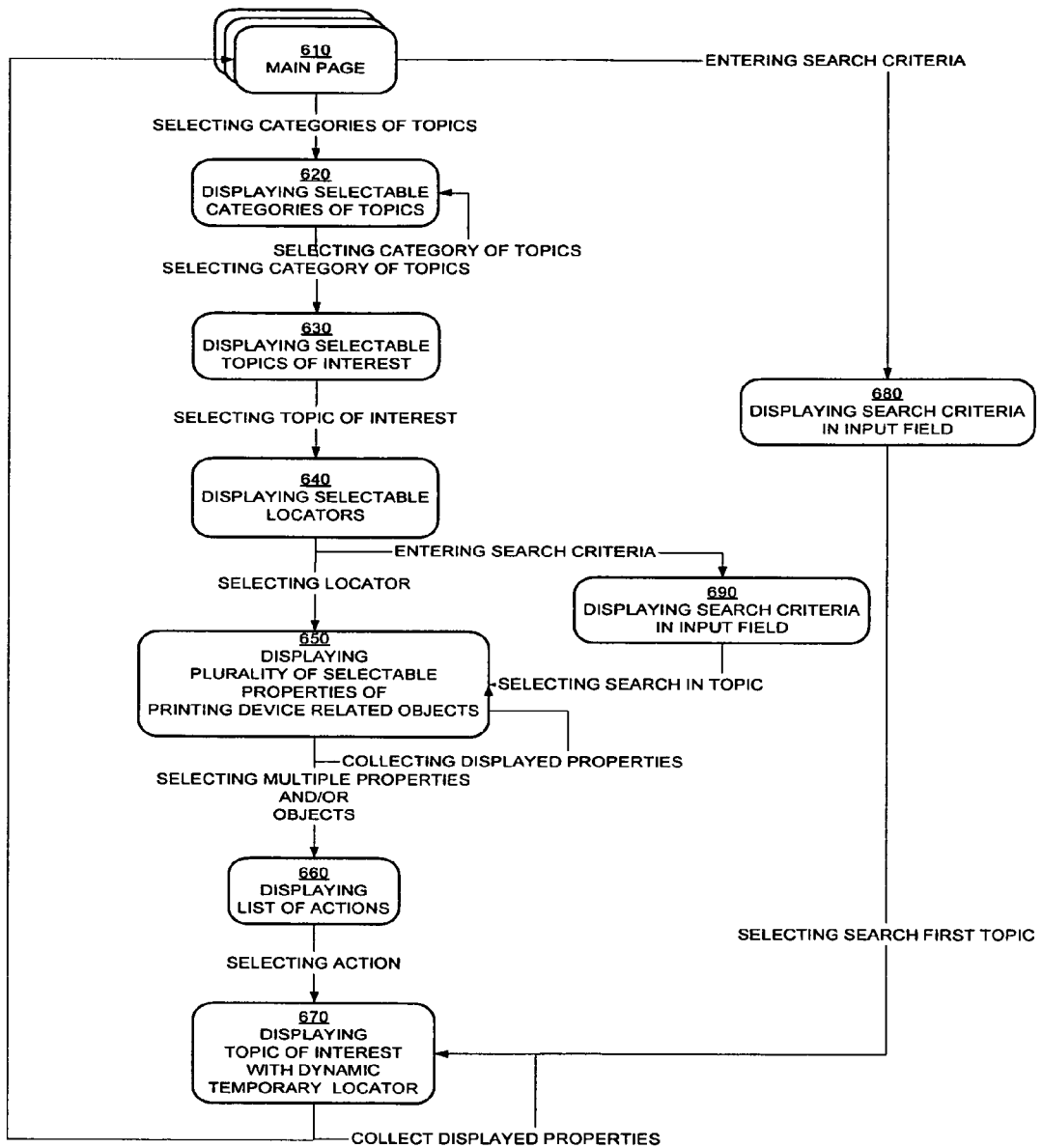
FIG. 6 is a flowchart for managing printing device related objects, in accordance with a preferred embodiment of the present invention.

FIG. 6 is a flowchart showing methods of managing printing devices and related objects, in accordance with a preferred embodiment of the present invention. This flowchart shows the main overall flow and procedures for using the methods described in the present invention.

In step 610, the user is presented with the main GUI page described earlier. The user is then offered a choice between two major workflow options.

If the user enters search criteria into search of objects input field, then in step 680 entered search criteria is displayed in input field. In FIG. 4, this search criteria input field is displayed as a GUI element in the lower right-hand corner of the main GUI menu. The user then selects search fist topic of interest. In step 670, the topic of interest is displayed, the first one sequentially found in the tree and which has matching the search criteria device properties among associated to the topic. The topic of interest is displayed with dynamic temporary locator to display only matching properties and objects. This new information is reflected in the refreshed main GUI, and control returns to the displaying of the main page in step 610.

If the user does not enter criteria into search of objects input field, then the user selects the other major workflow option of selecting from categories of topics and from topics of interest. In step 620, a list of selectable categories of topics is displayed. In an embodiment of the present invention, categories of topics are displayed in a tree format in a GUI pane, wherein categories of topics are represented by labeled, non-terminal nodes of the tree and a terminal nodes (or leafs) represent a topic of interest. The user then selects a category of topics. A category of topics can contain other categories of topics and topics of interest. If category of topics contains other categories of topics, then in step 620, as a result of the user selection of a category of topics, another list of selectable categories of topics is displayed.

If category of topics contains topics of interest, then in step 630, as a result of the user selection of a category of topics, selectable topics of interest are displayed, corresponding to the category selected by the user. Then the user selects a topic of interest from the displayed selection.

In step 640, a set of selectable locators is displayed. In an embodiment of the present invention, the set of selectable locators is displayed in a GUI menu, wherein each locator is associated with a labeled tab. The user is then offered a choice between two workflow options.

If the user enters search criteria into search of objects input field, then in step 690 entered search criteria is displayed in input field. In FIG. 4, this search criteria input field is displayed as a GUI element in the lower right-hand corner of the main GUI menu The user then selects search in topic of interest. In step 650, the topic of interest is displayed with dynamic temporary locator to display only matching properties and objects.

If the user does not enter criteria into search of objects input field, then the user selects the other workflow option of selecting a locator from the available choices.

In step 650, selectable properties of printing device related objects are displayed, corresponding to the locator selected by the user. The user is then offered a choice between two workflow options. If the user selects collect displayed properties of printing device related objects, then associated to the topic of interest and displayed for the selected locator properties are collected and in step 650, selectable properties are displayed.

If the user does not select selects collect displayed properties, then the user selects a property, multiple properties, and/or objects. In step 660, the user causes displaying a list of available actions for the selected property, multiple properties, and/or objects. In an embodiment of the present invention, the user causes displaying of this information by mouse right-clicking on a selection or selected region or by pressing appropriate popup menu key of the keypad, which causes a pop-up list to appear, listing available actions, as in FIGS. 4 and 5. Then the user selects an action from the list.

In step 670, selection of the topic of interest changes to target topic of interest, which is associated with the action. A new temporary dynamic object locator is created and selected. And finally associated with the target topic properties of printing device related objects in central view pane are displayed. Then control returns to the displaying of the main page in step 610.

Figure 7:
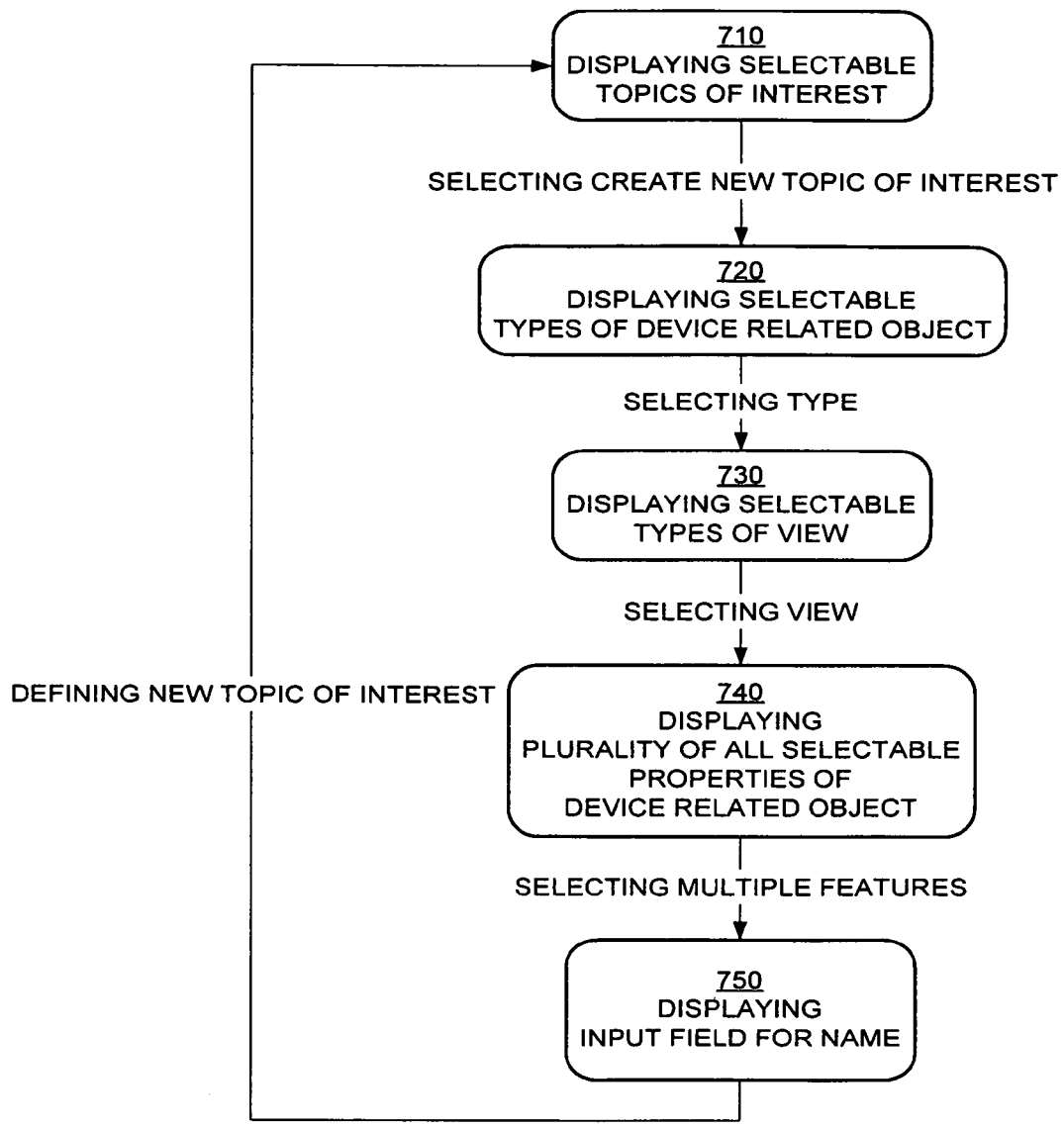
FIG. 7 is a flowchart for customizing topics of interest, in accordance with a preferred embodiment of the present invention.

FIG. 7 is a flowchart showing methods of customizing topics of interest, in accordance with a preferred embodiment of the present invention. The following steps enable a user to create and define a new topic of interest.

In step 710, a list of selectable topics of interest is displayed, and the user selects the option of creating a new topic of interest.

In step 720, the selectable types of device related objects are displayed. These types include printing devices, accounts, host, queues, jobs, queue users, alerts, counters, supplies, usage periods, workflow elements, map elements, etc. The user selects a type from the available options.

In step 730, the selectable types of views are displayed. These types include lists, tables, charts, diagrams, maps, forms, etc. The user selects a view from the available options.

In step 740, a plurality of all the selectable properties of device related objects are displayed. These properties of device related objects include those properties described earlier and elsewhere, such as FS, ppm (pages per minute), copy counter, toner level, user name, account print balance, queue performance, etc. The user can select a property or multiple properties and features.

In step 750, input field for name of the new topic of interest is displayed, into which user enters the name for the new topic. This name is typically used as a label in the terminal node or leaf in the tree display.

This completes the steps in the procedure for creating and defining a new topic of interest. At this point, the user can exit from this procedure, or the user can go back to step 710 to create and define a new topic of interest.

Figure 8:
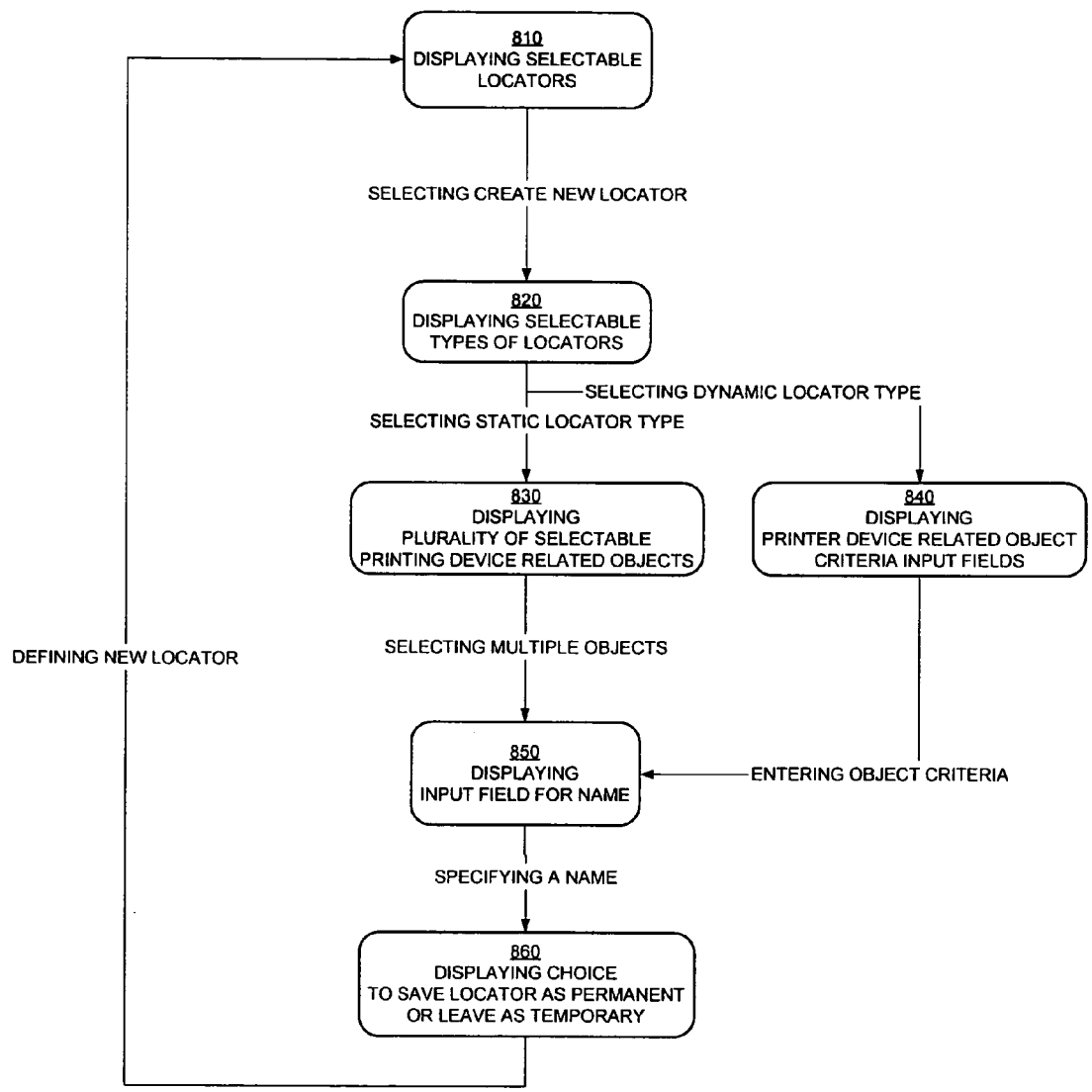
FIG. 8 is a flowchart for customizing of locators method, in accordance with a preferred embodiment of the present invention.

FIG. 8 is a flowchart showing methods of customizing locators, in accordance with a preferred embodiment of the present invention. The following steps enable a user to create and define a new locator.

In step 810, a list of selectable topic locators is displayed, and the user selects the option of creating a new topic locator.

In step 820, the selectable types of locators are displayed. Here the main choice for the user is a choice between dynamic locator type and static locator type. The user selects a type from these options.

If the user selects dynamic locator type, then in step 840, printer device related object criteria input fields are displayed. A dynamic locator is a locator of objects that filters objects based on criteria. The user enters object criteria into the input fields, and the control flow then goes to step 850.

If the user selects static locator type, then in step 830, a plurality of selectable printer device related objects is displayed. A static locator is a locator of objects for which a user manually selects the objects associated with the locator. The user manually selects one or more objects from the displayed set of selectable printer device related objects.

In step 850, input field for name of the new locator is displayed, into which user enters the name for the new locator. This name is typically used as a label of the tab in the GUI element within the main menu.

In step 860, the user is presented with a chose of whether to save the locator just defined as permanent or to leave it as temporary. Permanent locators are kept from execution of the application to execution, until user explicitly deletes them. In FIG. 4, pressing button Remove, deletes the permanent locator. Temporary locators are kept only during current execution of the application and can be closed. In FIG. 5, pressing button "X" 503 closes the temporary locator.

This completes the steps in the procedure for creating and defining a new locator. At this point, the user can exit from this procedure, or the user can go back to step 810 to create and define a new locator.

A new topic action, whose functionalities are described earlier, can be similarly defined by selecting a target topic of interest, specifying a criterion for filtering objects in the target topic of interest for a dynamic locator, and specifying a name or label to be associated with the new topic action.

Figure 9:
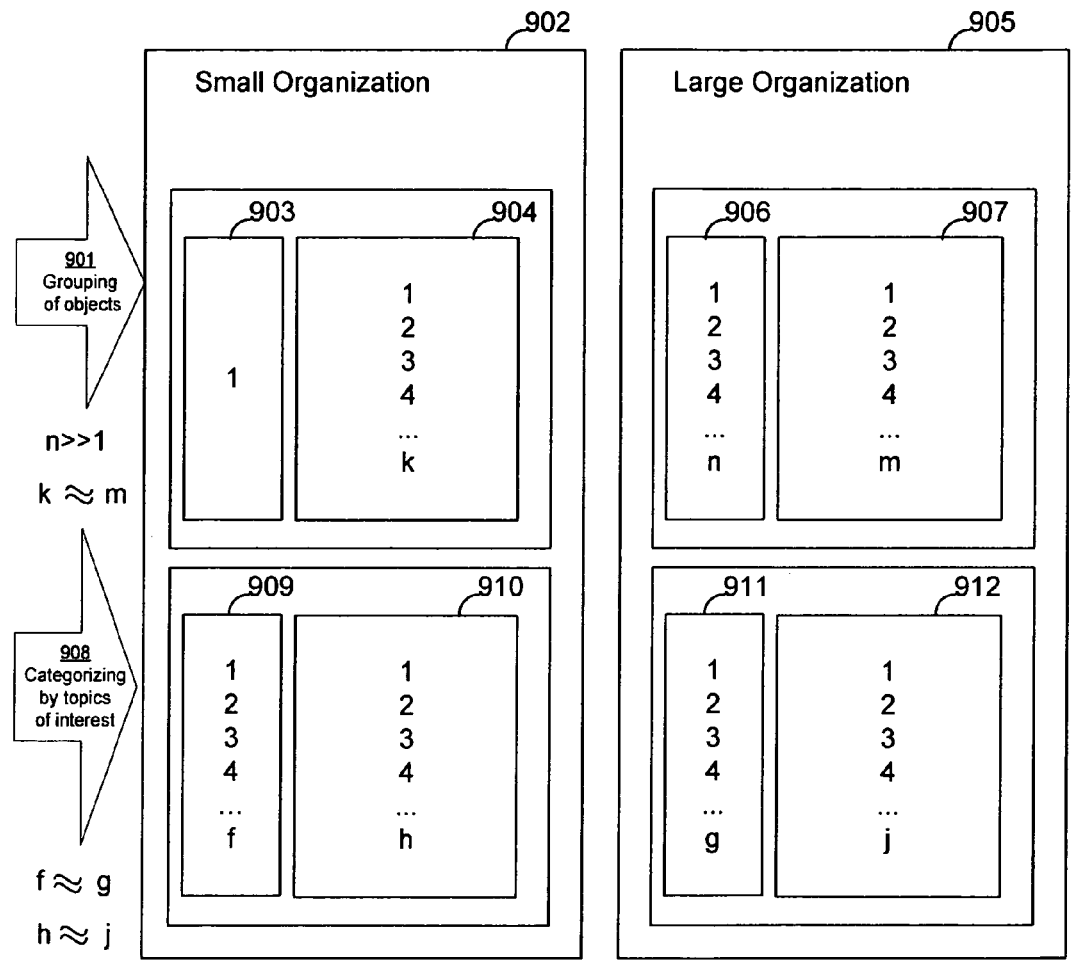
FIG. 9 is a diagram illustrating graceful scaling, wherein the number of topics of interest and the complexity of the displayed information stay roughly constant when the number of devices and objects increases significantly, in accordance with a preferred embodiment of the present invention.

FIG. 9 is a diagram illustrating graceful scaling, wherein the number of topics of interest and the complexity of the displayed information stay roughly constant when the number of devices and objects increases significantly, in accordance with a preferred embodiment of the present invention. In existing approaches of grouping of objects 901, for small organizations 902 which have very less printing devices and related objects, number of groups of objects reduced to 1 which contains all objects. So left pane 903 contains 1 group, and right pane 904 displays k contained objects. Large organizations 905 having more than 1000 printing devices and related objects are using grouping extensively to keep number of manageable at one time objects small. So left pane 906 now contains n groups where n>>1, and right pane 907 displays for each group m contained objects, where m≈k (m is almost equal to k).

Proposed approach defining categories of topics and topics of interest 908, for small organizations 902 which have not so many printing devices and related objects, provides possibility to define several categories of topics and topics of interest expressing interest in properties and other supported information. Properties and supported information does not depend much from the number of objects and therefore there is no direct dependency of interest from number objects. Left pane 909 for small organizations contains f categories of topics and topics of interest, left pane 911 for large organizations contains g categories of topics and topics of interest, where f≈g (almost equal). Right pane for small organization displays h properties for each topic of interest, and j properties for large organizations, where h≈j (almost equal).

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although this invention has been largely described using Windows terminology, one skilled in this art could see how the disclosed methods can be used with other operating systems, such as DOS, Unix, Linux, Palm OS, or Apple OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for collecting and displaying information about printing device related objects on a network, comprising:

providing a user with a graphic user interface of a main window of a device management application comprising a left pane tree and a central view pane;

the user selecting in the left pane tree at least one topic of interest from at least one category of interest from a list of topics of interest which are hierarchically arranged by categories of interest, which left pane tree displays the list of topics of interest and the categories of interest, and which left pane tree does not display printing device related objects, wherein the list of topics provides a central point user interface comprising at least one root category of topics comprising the group consisting of device management, account management, queue management, queue user management, and combinations thereof to enable the user's selection from multiple levels of printing device related objects with circular associations to each other, which printing device related objects comprising traditional printing devices and non-traditional printing device related objects, which non-traditional printing device related objects comprise the group consisting of users, devices, alerts, hosts, queues, jobs, accounts, balances, and combinations thereof;

the user specifying displaying in the central view pane of object property information associated with the selected at least one topic of interest about the printing device related objects;

and causing displaying in the central view pane of object property information associated with the selected at least one topic of interest about the printing device related objects, while the left pane tree does not display printing device related objects wherein a list of devices can be displayed in the central view pane, and wherein displaying of the list of devices comprises:

optionally expanding a Device Management category in order to select a List View topic of interest within the Device Management category;

selecting the List View topic of interest within the Device Management category; and causing the list of devices to be displayed in the central view pane using a default object locator ALL, which locates all objects without any filtering, and the list of devices is never displayed in the left pane tree.

2. The method of claim 1, wherein displaying of the information associated with the selected at least one topic of interest about the printing device related objects comprises:

selecting at least one object locator to filter and display printing device related object properties and information that satisfy at least one criterion defined for the selected at least one object locator.

3. The method of claim 2, wherein the at least one object locator comprises Static filtering to manually select at least one object; Dynamic filtering to select at least one object based on at least one criterion; Permanent filtering wherein search criteria and associated object criteria are saved; and Temporary filtering wherein a search criterion is not saved.

4. The method of claim 2, further comprising a GUI to define a new object locator, comprising:

selecting at least one criterion for filtering objects for a dynamic locator;

selecting manually at least one printing device related object for a static locator;

specifying a name associated with the new object locator; and optionally specifying the new object locator as permanent.

5. The method of claim 2, further comprising a GUI comprising:

selecting at least one property and printing device related object;

selecting an action from the displayed list of actions associated with the selected at least one property and printing device related object; and displaying a topic of interest associated with the selected action.

6. The method of claim 1, wherein the selecting of the at least one topic of interest comprises selecting the at least one topic of interest in a first pane in a menu;

wherein the displaying of the object property information associated with the selected topic of interest comprises displaying the object property information in a second pane in the menu; and the number of the at least one topic of interest in the first pane and the number of the object property information in the second pane stay constant while there is an increase in the number of printing devices on the network.

7. The method of claim 1, further comprising a GUI to define a new topic of interest, comprising:

selecting a type of device related object associated with the new topic of interest;

selecting a type of view of device related object associated with the new topic of interest;

selecting at least one property of device related object associated with the new topic of interest; and specifying a name associated with the new topic of interest.

8. The method of claim 1, further comprising a GUI to define a new topic action, comprising:

selecting a target topic of interest;

specifying a criterion for filtering objects in the target topic of interest for a dynamic locator; and specifying a name associated with the new topic action.

9. A computer program product in a non-transitory computer-readable storage medium for collecting and displaying information about printing device related objects on a network, comprising machine-readable code for causing a machine to perform the method steps of:

providing a user with a graphic user interface of a main window of a device management application comprising a left pane tree and a central view pane;

the user selecting in the left pane tree at least one topic of interest from at least one category of interest from a list of topics of interest which are hierarchically arranged by categories of interest, which left pane tree displays the list of topics of interest and the categories of interest, and which left pane tree does not display printing device related objects, wherein the list of topics provides a central point user interface comprising at least one root category of topics comprising the group consisting of device management, account management, queue management, queue user management, and combinations thereof to enable the user's selection from multiple levels of printing device related objects with circular associations to each other, which printing device related objects comprising traditional printing devices and non-traditional printing device related objects, which non-traditional printing device related objects comprise the group consisting of users, devices, alerts, hosts, queues, jobs, accounts, balances, and combinations thereof;

the user specifying displaying in the central view pane of object property information associated with the selected at least one topic of interest about the printing device related objects;

and causing displaying in the central view pane of object property information associated with the selected at least one topic of interest about the printing device related objects, while the left pane tree does not display printing device related objects wherein a list of devices can be displayed in the central view pane, and wherein displaying of the list of devices comprises:

optionally expanding a Device Management category in order to select a List View topic of interest within the Device Management category;

selecting the List View topic of interest within the Device Management category; and causing the list of devices to be displayed in the central view pane using a default object locator ALL, which locates all objects without any filtering, and the list of devices is never displayed in the left pane tree.

10. The computer program product of claim 9, wherein displaying of the information associated with the selected at least one topic of interest about the printing device related objects comprises:

selecting at least one object locator to filter and display printing device related object properties and information that satisfy at least one criterion defined for the selected at least one object locator.

11. The computer program product of claim 10, wherein the at least one object locator comprises Static filtering to manually select at least one object; Dynamic filtering to select at least one object based on at least one criterion; Permanent filtering wherein search criteria and associated object criteria are saved; and Temporary filtering wherein a search criterion is not saved.

12. The computer program product of claim 9, wherein the selecting of the at least one topic of interest comprises selecting the at least one topic of interest in a first pane in a menu;
wherein the displaying of the object property information associated with the selected topic of interest comprises displaying the object property information in a second pane in the menu;
and the number of the at least one topic of interest in the first pane and the number of the object property information in the second pane stay constant while there is an increase in the number of printing devices on the network.

13. The computer program product of claim 9,
further comprising machine-readable code for causing a machine to provide a GUI to define a new topic of interest by performing the method steps of:
selecting a type of device related object associated with the new topic of interest;
selecting a type of view of device related object associated with the new topic of interest;
selecting at least one property of device related object associated with the new topic of interest; and
specifying a name associated with the new topic of interest; and
further comprising machine-readable code for causing a machine to provide a GUI to define a new topic action by performing the method steps of:
selecting a target topic of interest;
specifying a criterion for filtering objects in the target topic of interest for a dynamic locator; and
specifying a name associated with the new topic action.

14. The computer program product of claim 9,
further comprising machine-readable code for causing a machine to provide a GUI to define a new object locator by performing the method steps of:
selecting at least one criterion for filtering objects for a dynamic locator;
selecting manually at least one printing device related object for a static locator;
specifying a name associated with the new object locator; and
optionally specifying the new object locator as permanent; and
further comprising machine-readable code for causing a machine to provide a GUI by performing the method steps of:
selecting at least one property and printing device related object;
selecting an action from the displayed list of actions associated with the selected at least one property and printing device related object; and
displaying a topic of interest associated with the selected action.

15. A computing system including a microprocessor, comprising a print engine, for collecting and displaying information about printing device related objects on a network, comprising:
providing a user with a graphic user interface of a main window of a device management application comprising a left pane tree and a central view pane;
the user selecting in the left pane tree at least one topic of interest from at least one category of interest from a list of topics of interest which are hierarchically arranged by categories of interest, which left pane tree displays the list of topics of interest and the categories of interest, and which left pane tree does not display printing device related objects, wherein the list of topics provides a central point user interface comprising at least one root category of topics comprising the group consisting of device management, account management, queue management, queue user management, and combinations thereof to enable the user's selection from multiple levels of printing device related objects with circular associations to each other, which printing device related objects comprising traditional printing devices and non-traditional printing device related objects, which non-traditional printing device related objects comprise the group consisting of users, devices, alerts, hosts, queues, jobs, accounts, balances, and combinations thereof;
the user specifying displaying in the central view pane of object property information associated with the selected at least one topic of interest about the printing device related objects;
and causing displaying in the central view pane of object property information associated with the selected at least one topic of interest about the printing device related objects, while the left pane tree does not display printing device related objects wherein a list of devices can be displayed in the central view pane, and wherein displaying of the list of devices comprises:
optionally expanding a Device Management category in order to select a List View topic of interest within the Device Management category;
selecting the List View topic of interest within the Device Management category; and causing the list of devices to be displayed in the central view pane using a default object locator ALL, which locates all objects without any filtering, and the list of devices is never displayed in the left pane tree.

16. The computing system of claim 15, wherein displaying of the information associated with the selected at least one topic of interest about the printing device related objects comprises:
selecting at least one object locator to filter and display printing device related object properties and information that satisfy at least one criterion defined for the selected at least one object locator.

17. The computing system of claim 16, wherein the at least one object locator comprises Static filtering to manually select at least one object; Dynamic filtering to select at least one object based on at least one criterion; Permanent filtering wherein search criteria and associated object criteria are saved; and Temporary filtering wherein a search criterion is not saved.

18. The computing system of claim 17,
further comprising a GUI to define a new object locator, comprising:
selecting at least one criterion for filtering objects for a dynamic locator;
selecting manually at least one printing device related object for a static locator;
specifying a name associated with the new object locator; and
optionally specifying the new object locator as permanent; and
further comprising a GUI comprising:
selecting at least one property and printing device related object;
selecting an action from the displayed list of actions associated with the selected at least one property and printing device related object; and displaying a topic of interest associated with the selected action.

19. The computing system of claim 15, wherein the selecting of the at least one topic of interest comprises selecting the at least one topic of interest in a first pane in a menu;
- wherein the displaying of the object property information associated with the selected topic of interest comprises displaying the object property information in a second pane in the menu;
- and the number of the at least one topic of interest in the first pane and the number of the object property information in the second pane stay constant while there is an increase in the number of printing devices on the network.

20. The computing system of claim 15,
- further comprising a GUI to define a new topic of interest, comprising:
- selecting a type of device related object associated with the new topic of interest;
- selecting a type of view of device related object associated with the new topic of interest;
- selecting at least, one property of device related object associated with the new topic of interest; and
- specifying a name associated with the new topic of interest; and
- further comprising a GUI to define a new topic action, comprising:
- selecting a target topic of interest;
- specifying a criterion for filtering objects in the target topic of interest for a dynamic locator; and
- specifying a name associated with the new topic action.

* * * * *